D. R. LOVEJOY.
PROCESS FOR EFFECTING CHEMICAL ACTION IN GASES.
APPLICATION FILED FEB. 18, 1903.

No. 904,070.  Patented Nov. 17, 1908.

Witnesses
Inventor
Dummitt Ross Lovejoy
By his Attorneys

UNITED STATES PATENT OFFICE.

DIMMITT R. LOVEJOY, OF NIAGARA FALLS, NEW YORK, ASSIGNOR, BY MESNE ASSIGNMENTS, TO WALTER E. F. BRADLEY, TRUSTEE, OF NEW YORK, N. Y.

PROCESS FOR EFFECTING CHEMICAL ACTION IN GASES.

No. 904,070.    Specification of Letters Patent.    Patented Nov. 17, 1908.

Application filed February 18, 1903. Serial No. 143,974.

*To all whom it may concern:*

Be it known that I, DIMMITT R. LOVEJOY, a citizen of the United States, residing at Niagara Falls, in the county of Niagara and State of New York, have invented certain new and useful Improvements in Processes for Effecting Chemical Action in Gases, of which the following is a specification.

This invention relates to improvements in processes for effecting the union or chemical action of gases by the agency of electric arcs formed within or in connection with a chamber in which are contained the mixed gases to be chemically combined.

By the term "mixed gases" I mean either those which have been artificially mixed or those which exist in nature already mixed, the step of mixing the gases not being a part of my present invention. U. S. Patents No. 709,867 of September 30th, 1902, and No. 829,873 of August 28th, 1906, apparatus is described for this purpose in which a series of electrodes is moved past another series of electrodes oppositely charged to a high tension, so as to successively form, elongate, and break arcs between such electrodes, within a chamber in which the mixed gases to be united are confined.

I have discovered that the desired effect may be more successfully produced by subjecting the gases to radiant energy from radium, uranium, helium, or other source of such energy, either preliminary to or during the time of action of the electric arcs on such mixed gases. The effect of such radiant energy is to ionize the gas, and thereby increase the conductivity. Inasmuch as my present improvement relates to the conjoint agency of such radiant energy and of the electric arcs, the invention is one and the same in principle, whether the mixed gases be subjected to such radiant energy preliminarily to their admission to the chamber where the electric arcs are formed, or subjected to such radiant energy within such treating chamber and simultaneously with the action of the electric arcs on said gases.

In the accompanying drawings I have shown, diagrammatically, two forms of apparatus by which my process may be carried into effect in the different ways above indicated.

Figure 1:
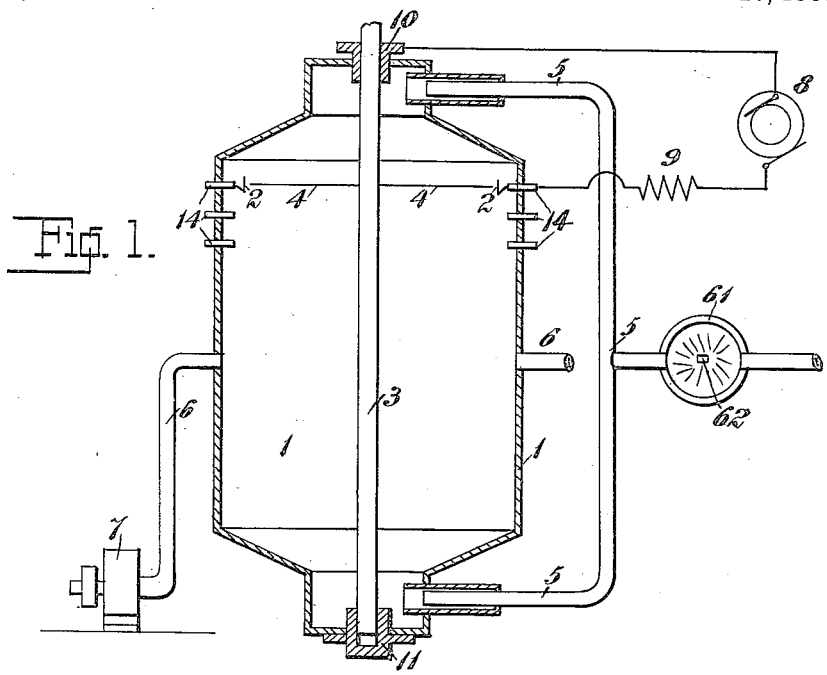
Figure 2:
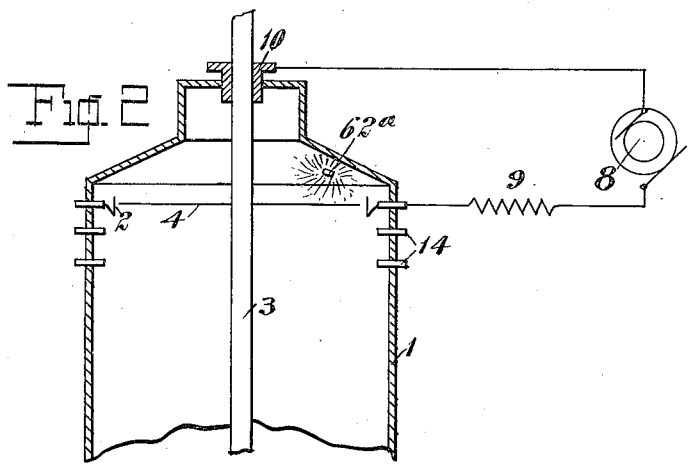

Figure 1 is a diagrammatic longitudinal section of an apparatus adapted for subjecting the mixed gases to radiant energy from a suitable source of such energy, immediately before their admission to the chamber where they are subjected to the effect of electric arcs, for instance as described in my Patent No. 829,873, hereinbefore referred to. Fig. 2 is a similar view in which the gases are subjected to the action of such radiant energy within the chamber through which they are passed under the influence of the electric arcs, and simultaneously to their subjection to the effect of such electric arcs.

Referring to Fig. 1, 1 represents a cylinder having numerous fixed electrodes 2 projecting from its inner periphery. 3 represents a shaft mounted centrally and rotating within the cylinder 1 and carrying a number of movable electrodes 4 connected mechanically and electrically with the said shaft. 5 represents the induction pipe for admission of fresh mixed gases, (atmospheric air, for example), and 6, 6, outlet ducts for the removal of the nitrogen compounds formed under the treatment. 7 indicates an exhaust fan to illustrate suitable means for causing the flow of gases through the chamber; 8 a suitable source of high tension electric currents, either unidirectional or alternating, and 9 a series of inductances or choke-coils each having one terminal connected individually to the fixed electrodes 2 and, in practice, having their other terminals grouped together and connected to one pole of the generator 8, the circuit being completed by connecting the shaft 3, by means of a conductor with the other pole of the generator 8. The shaft 3 is preferably mounted in insulating bearings 10 and 11 at top and bottom as described in my prior application, and the stationary electrodes 2 mounted in tubes or bushings 14 of porcelain or other insulating material set in packings in the cylinder walls adapted to prevent the passage of gas and also to permit the radial adjustment of the fixed electrodes 2 relatively to the electrodes 4 which revolve in proximity to such stationary electrodes. 61 represents a chamber in the induction pipe 5 containing a body 62 of radium or other suitable source of radiant energy to which the inflowing gas is subjected immediately before entering the cylinder 1.

In Fig. 2 similar reference characters indicate corresponding parts and 62ª indicates a body of radium or other source of radiant energy, to the effect of which the gas is subjected within the chamber simultaneously with the action of the electric arcs upon it.

As an example of the voltage and strength of the current which may be employed I would state that a voltage of from 5000 to 6000 volts, and a current of about 3 amperes may be employed. The invention, however, is not limited to the strength of current and voltage herein given, the most advantageous conditions in this respect being determined by those skilled in the art.

In carrying my invention into effect, Roentgen rays or concentrated rays from the sun or other source of radiant energy, used in conjunction with the electric arc, are to be regarded as equivalents of radiant energy emitted spontaneously from a substance capable of giving forth such energy as first described. As an instance of the degree of radiant energy to be employed I may state that an eight-inch Crookes tube arranged in the path of the gases or within the chamber at suitable points has been found to give the desired effect.

It will be understood that while this invention is described particularly with reference to the formation of oxids of nitrogen it is also applicable to effecting the chemical combination of any other gases in a similar manner.

Having thus described my invention, the following is what I claim as new therein, and desire to secure by Letters Patent:—

1. The process of treating gases to effect chemical action therein, which comprises ionizing the gases, and subjecting them to the electric arc.

2. The process of treating gases to effect chemical action therein, which comprises ionizing the gases and in conjunction therewith passing them in close proximity to electric arcs successively formed, elongated and broken.

3. The process of treating gases to effect chemical action therein, which comprises subjecting such gases to electric discharges in the form of electric arcs, and in conjunction therewith to the influence of a radio-active body.

4. The process of promoting chemical action in mixed gases, which comprises subjecting the mixture of said gases to the influence of a radio-active body and to the action of the electric arc.

D. R. LOVEJOY.

Witnesses:
 CLAUDE K. MILLS,
 WM. GIRLING.